(12) United States Patent
Keramida et al.

(10) Patent No.: US 10,758,955 B2
(45) Date of Patent: Sep. 1, 2020

(54) METHOD OF REMEDIATING SUB-SLAB VAPORS AND SOILS OF BUILDINGS AND SYSTEM THEREOF

(71) Applicant: Keramida Inc., Indianapolis, IN (US)

(72) Inventors: Vasiliki Keramida, Greenfield, IN (US); Michael Devir, Carmel, IN (US)

(73) Assignee: KERAMIDA INC., Indianapolis, IN (US)

( * ) Notice: Subject to any disclaimer, the term of this patent is extended or adjusted under 35 U.S.C. 154(b) by 0 days.

(21) Appl. No.: 16/276,676

(22) Filed: Feb. 15, 2019

(65) Prior Publication Data

US 2019/0255583 A1 Aug. 22, 2019

Related U.S. Application Data

(60) Provisional application No. 62/632,236, filed on Feb. 19, 2018.

(51) Int. Cl.
| | |
|---|---|
| *B09C 1/00* | (2006.01) |
| *B09C 1/08* | (2006.01) |
| *C01B 13/11* | (2006.01) |
| *E02D 31/00* | (2006.01) |
| *E02D 1/08* | (2006.01) |

(52) U.S. Cl.
CPC ............... *B09C 1/08* (2013.01); *C01B 13/11* (2013.01); *E02D 1/08* (2013.01); *E02D 31/00* (2013.01); *C01B 2201/14* (2013.01); *C01B 2201/82* (2013.01); *C01B 2201/90* (2013.01)

(58) Field of Classification Search
CPC ..................................... B09C 1/00; B09C 1/08
See application file for complete search history.

(56) References Cited

U.S. PATENT DOCUMENTS

| | | | |
|---|---|---|---|
| 5,385,677 A * | 1/1995 | Venable | B09C 1/08 166/65.1 |
| 6,457,905 B1 | 10/2002 | Nickell | |
| 7,667,087 B2 | 2/2010 | Ball | |
| 8,206,062 B2 | 6/2012 | Hoag et al. | |
| 8,210,773 B2 | 7/2012 | Swearingen et al. | |
| 2004/0120771 A1* | 6/2004 | Vinegar | B01D 53/002 405/128.4 |
| 2010/0150657 A1* | 6/2010 | Ball | B09C 1/002 405/128.5 |
| 2010/0272600 A1* | 10/2010 | Morneault | A61L 9/20 422/4 |
| 2011/0293492 A1* | 12/2011 | Gustafson | B09C 1/002 423/3 |
| 2014/0110344 A1 | 4/2014 | Hoag et al. | |

* cited by examiner

Primary Examiner — Janine M Kreck
(74) Attorney, Agent, or Firm — Taft Stettinius & Hollister LLP; Stephen F. Rost

(57) ABSTRACT

A method is provided for treating contaminated vapors in an area below a slab of a building such that the slab is located above a first layer of gravel and a second layer of soil. The method includes providing an ozone unit, a riser pipe, and tubing. An area below the slab where contaminated vapors need treated is first detected and then a hole is formed in the slab to define an injection location. The method also includes positioning the riser pipe in the hole at the injection location and coupling the tubing between the ozone unit and the riser pipe. The method further includes dispensing ozone from the ozone unit to flow through the tubing and the riser pipe to treat contaminated vapors in the area below the slab.

20 Claims, 2 Drawing Sheets

METHOD OF REMEDIATING SUB-SLAB VAPORS AND SOILS OF BUILDINGS AND SYSTEM THEREOF

RELATED APPLICATIONS

This application claims the benefit of U.S. Provisional Patent Application Ser. No. 62/632,236, filed Feb. 19, 2018, the disclosure of which is hereby incorporated by reference in its entirety.

FIELD OF THE DISCLOSURE

The present disclosure relates to a method and a system for remediating chlorinated solvents and petroleum hydrocarbons in sub-slab vapors and shallow sub-slab soils of buildings.

BACKGROUND

Chlorinated solvents and petroleum hydrocarbons have long been used by industry, including the military, dry cleaners, and other businesses. Their use has resulted in releases into the environment which have contaminated soils and groundwater, which generate vapors of these contaminants that migrate through the vadose zone and through utility trenches and sewers and accumulate under buildings and migrate or threaten to migrate into the indoor air of these buildings, and also intrude directly into buildings via sewer vapor leaks, thereby endangering the health of their inhabitants.

Chlorinated solvents have persisted in the environment for many decades and the threat of the impact to human health from their vapors is the leading concern of their contamination of the environment. These chlorinated solvents and their degradation products are toxic to human health and many are also carcinogenic. While petroleum hydrocarbons do not exhibit the same persistence as chlorinated solvents in the environment, they too are toxic and some are carcinogenic.

While there are known remediation technologies and processes applied to soils and groundwater contaminated by chlorinated solvents and petroleum hydrocarbons, there are no remedial processes currently available for the vapors generated by such contamination which have accumulated under buildings and threaten the health of their inhabitants. The presence of such chlorinated vapors in the sub-slab of buildings is conventionally addressed via mitigation, through their venting to the atmosphere by depressurizing the sub-slab space rather than by elimination through remediation. The same is true for petroleum compounds.

The sub-slab vapor mitigation processes and systems presently used are not reliable, due to inherent concerns with the principle of their application and appropriateness, as they don't actually remediate the contamination, but rather transfer it from one location to another. Serious concerns have also been documented with regards to their design, installation, operation and maintenance, and measured effectiveness. As a result, the installation of a vapor mitigation system cannot assure the risk to the health of the building's inhabitants will be reduced to acceptable levels.

Mitigation, furthermore, even if effective, would require long term operation, maintenance and monitoring of the sub-slab vapors and indoor air, and the placement of a restrictive covenant on the deed of the property regarding the need to have, at all times, a vapor mitigation system operating at that building.

SUMMARY

In one embodiment of this disclosure, ozone may be applied in the contaminated sub-slab of buildings aimed to remediate, through destruction, the chlorinated solvent vapors and vapors of their degradation products, as well as petroleum vapors, present in the sub-slab.

In many cases of contamination by chlorinated solvents and petroleum, the presence of vapors from these contaminants in the sub-slab of buildings is the result of releases of chlorinated solvents and petroleum under these buildings, and the entrapment of their vapors in the building's sub-slab space, along with the adsorption of the chlorinated solvents and petroleum on the uppermost layer of the gravel/soil in the sub-slab of the building. The destruction of organic contaminants by ozone has been assessed for many years and has been applied to contaminated groundwater and soil, but not to contaminated vapors under buildings.

The application of ozone can be done alone or in the presence of hydroxyl radicals (OH) and/or UV light, for a synergistic effect by the two technologies, based on the organic contaminants present in the vapors and upper gravel/soil stratum of the building's sub-slab. Moisture may also be introduced, if needed.

The application of ozone as well as of the ozone/OH/UV light combination to the sub-slab of buildings to destruct the vapors of organic pollutants in the sub-slab is a novel application.

In another embodiment, a remediation system for performing a remediation process for treating contaminants located in an area below a slab of a building includes an ozone unit for generating a supply of ozone; a plurality of injection locations defined in the sub-slab area, where each of the plurality of injection locations is spaced from another of the plurality of injection locations by a predefined distance; a riser pipe positioned at each of the plurality of injections locations, the riser pipe having a defined length configured to extend from a top surface of the slab to a location below the slab, where the riser pipe comprises an outlet at the location below the slab; and a tubing coupled between the ozone unit and the riser pipe; wherein, during the remediation process, the ozone unit is disposed in its enabled position to dispense ozone through the tubing and the riser pipe; further wherein, the ozone exits the outlet of the riser pipe at each of the plurality of injection zones and disperses in the area below the slab to treat contaminants located thereabout.

In a first example of this embodiment, the system may include a plurality of application zones defined at each of the injection zones by an area of dispersion of the ozone, wherein each of the plurality of application zones at least partially overlaps with another of the plurality of application zones. In a second example, a screen may be coupled near the outlet of the riser pipe. In a third example, the system may include a UV light unit for emitting UV light, the UV light unit coupled to each of the plurality of injection zones for emitting UV light with the ozone at each of the plurality of injection zones. In a fourth example, the UV light unit is coupled to the riser pipe for emitting UV light simultaneously as the ozone unit dispenses ozone in the area below the slab.

In a fifth example, the system may include a hydroxyl (OH) unit for generating hydroxyl radicals, the hydroxyl unit being coupled to each of the plurality of injection zones for supplying hydroxyl radicals with the ozone at each of the plurality of injection zones. In a sixth example, the system may include a UV light unit for emitting UV light, the UV light unit being coupled to each of the plurality of injection zones for emitting UV light with the ozone at each of the plurality of injection zones; a hydroxyl (OH) unit for generating hydroxyl radicals, the hydroxyl unit being coupled to each of the plurality of injection zones for supplying hydroxyl radicals with the ozone at each of the plurality of injection zones; wherein, the UV light unit and hydroxyl unit are operably coupled to the riser pipe to supply UV light and hydroxyls simultaneously as the ozone unit dispenses ozone to each of the plurality of injection locations.

In a further embodiment of the present disclosure, a method is provided for treating contaminated vapors in an area below a slab of a building, where the slab is located above a first layer of gravel and a second layer of soil. The method includes providing an ozone unit, a riser pipe, and tubing; detecting an area below the slab where contaminants need treated; forming a hole in the slab to define an injection location; positioning the riser pipe in the hole at the injection location; coupling the tubing between the ozone unit and the riser pipe; and dispensing ozone from the ozone unit to flow through the tubing and the riser pipe to treat contaminants in the area below the slab.

In one example of this embodiment, the positioning step comprises positioning a first end of the riser pipe at or above a top surface of the slab and a second end at a location below the slab. In a second example, the method may include disposing the second end in either the first layer of gravel or the second layer of soil. In a third example, the forming step comprises defining a plurality of injection locations in the area below the slab.

In a fourth example, the method may include spacing each of the plurality of injection locations from one another by a predefined distance. In a fifth example, the dispensing step may include forming an ozone application zone at each of the plurality of injection locations, where the application zone formed at each of the plurality of injection locations at least partially overlaps another application zone at another of the plurality of injection locations. In another example, the method may include dispersing ozone through a screen coupled at an outlet of the riser pipe in the area below the slab. In yet another example, the method may include providing a UV light unit; coupling the UV light unit to the injection location; and emitting UV light from the UV light unit into the area below the slab. In a further example, the method may include providing a hydroxyl radical generating unit; coupling the hydroxyl unit to the injection location; supplying hydroxyl radicals from the hydroxyl unit into the area below the slab.

In yet a further embodiment of the present disclosure, a method is provided for treating contaminated vapors in an area below a slab of a building, where the slab is located above a first layer of gravel and a second layer of soil. The method includes providing an ozone unit, a UV light unit, a hydroxyl unit, and a riser pipe; detecting if an area below the slab requires remediation of any contaminated vapors located thereabout; determining how many and where an injection location is required to treat the area below the slab if contaminants are detected; forming a hole in the slab to define each injection location; positioning the riser pipe in the hole at each injection location; coupling the ozone unit, the UV light unit, and the hydroxyl unit to each injection location; and treating the contaminants by dispensing ozone from the ozone unit, emitting UV light from the UV light unit, and supplying hydroxyl radicals from the hydroxyl unit in the area below the slab.

In one example of this embodiment, the treating step may include dispensing ozone from the ozone unit, emitting UV light from the UV light unit, and supplying hydroxyl radicals from the hydroxyl unit simultaneously. In another example, the method may include spacing each injection location apart from one another by a defined distance such that the ozone dispensed, UV light emitted and hydroxyl radicals supplied at one injection location overlaps with the ozone dispensed, UV light emitted and hydroxyl radicals supplied at an adjacent injection location. In yet a further example, the method may include coupling tubing from the ozone unit, the UV light unit and the hydroxyl unit to the riser pipe at each injection location.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

In the present disclosure, a method is proposed for applying ozone or combined ozone and ultraviolet remediation or ozone and hydroxyl radicals (OH), in a sub-slab area of a building. To do so, the method includes a plurality of blocks or steps to be executed for the remediation of contaminated vapors. It is necessary to understand or analyze the contamination present in the sub-slab and the remedial needs of a property owner for applying the ozone or ozone/UV or ozone/OH remediation in the sub-slab. This method involves assessing the types of contaminants present in the sub-slab upfront, their concentrations, and content in vapors and shallow soils in the building's sub-slab.

Figure 1:
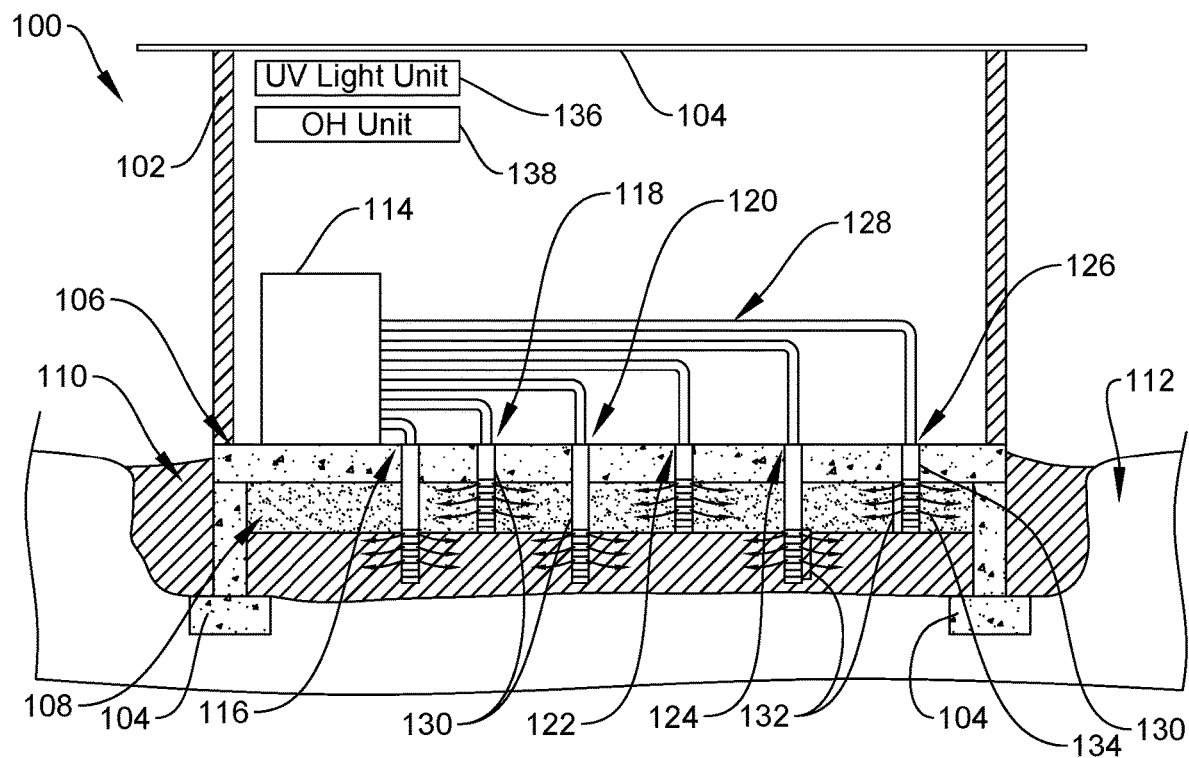
FIG. 1 is a cross-section schematic of building and sub-slab for the treatment of vapors in accordance with the present disclosure.

Referring to FIG. 1, for example, an illustrated embodiment of a building 102 is shown with a vapor remediation system 100 being implemented in the building to treat contaminated vapors found below the building. In particular, the building 102 is shown having a support structure 104 including footers as shown. The building 102 is further constructed on a concrete slab 106, which is disposed above an area of gravel 108 and sub-slab soil. The gravel 108 may be located above an area of fill soil 110 or dirt, which may be deposited in relationship to native soil 112 that surrounds the building.

The system 100 may further include an ozone unit or a combination of an ozone unit/UV light unit or a combination ozone unit/OH unit, 114, for executing at least a portion of the vapor remediation method. The ozone or ozone/UV light or ozone/OH unit 114 may be any commercially available ozone unit such as the OSU20-52 or MOSU20-52 from H2O Engineering Inc., supplemented by any commercially available UV light generating unit 136 or OH generating unit 138. The ozone unit 114 and any supplemental UV light and/or OH unit may provide ozone, UV light, and/or OH radicals to a given area via tubing or piping 128.

In the illustrated embodiment of FIG. 1, the system 100 may include a plurality of injection points where ozone or combination of ozone and UV light and/or OH may be applied. For example, the system 100 may include a first injection location 118, a second injection location 120, a third injection location 122, a fourth injection location 124, and a fifth injection location 126. There may be additional injection locations, or in other embodiments, there may be fewer locations. At each location, however, it is determined via the remediation process that an area below the slab 106 contains contaminant-carrying vapors that need to be treated. To reach these locations, a hole may be drilled at each location and a riser pipe 130 may be positioned within the hole. The riser pipe 130 may have a length that extends from the top surface of the slab 106 to an area below the slab. At the first location 116, for example, the riser pipe 130 may extend from the concrete slab 106 to the fill soil 110 below the gravel 108. On the other hand, at the second location 118, the corresponding riser pipe 130 extends from the top of the concrete slab 106 to the gravel and sub-slab soil region 108.

At the end of the riser pipe 130, a screen 132 may be disposed to allow the ozone gas 134 to disperse from the pipe 130 and into the surrounding area. As shown, the gas 134 may disperse through the gravel region 108 and fill soil region 110 to treat any toxic vapors. In effect, the remediation process may be executed via the combination of the ozone unit 114, ozone delivery tubing 128, riser pipe 130 and screen 132 as shown in FIG. 1. Moreover, the UV light unit 136 and/or the OH unit 138 may be optionally incorporated with the ozone unit 114.

Figure 2:
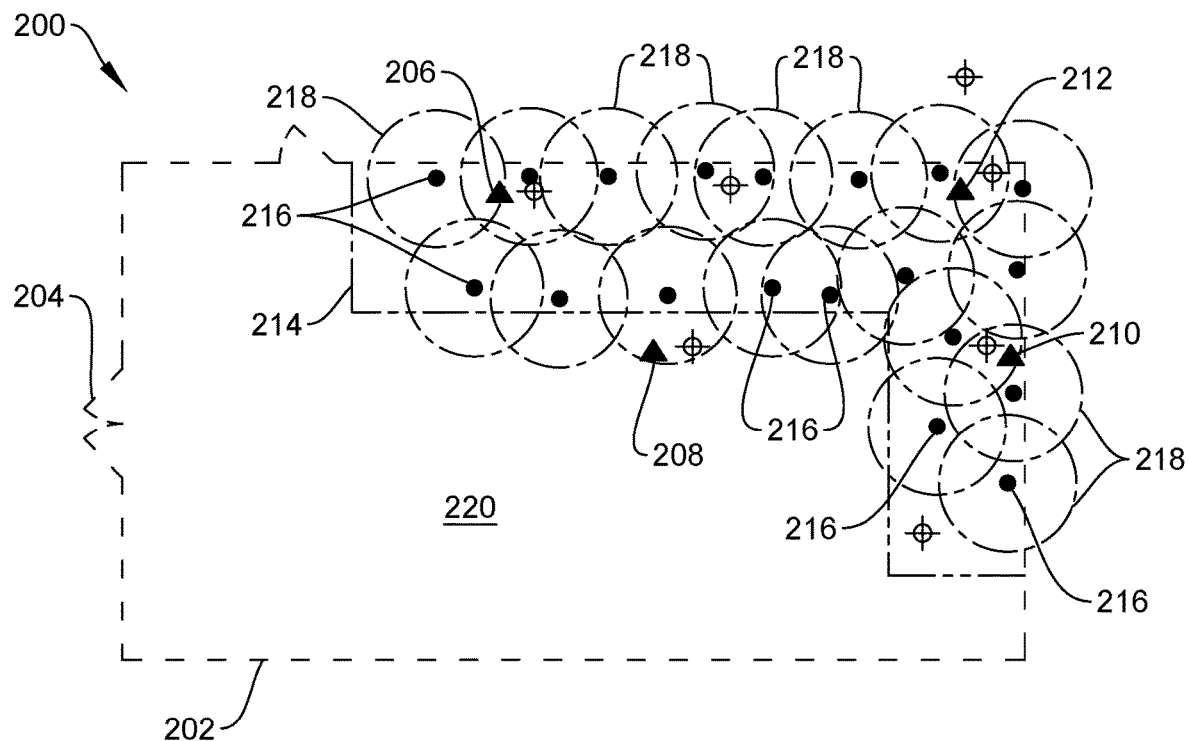
FIG. 2 is a schematic of a building layout with areas below a slab to be treated with ozone and OH and/or UV light.

In FIG. 2, a similar embodiment of a building 200 is shown. The building 200 may be similar to the building 102 of FIG. 1. In FIG. 2, the building 200 is representative of a former dry-cleaning building that includes an outer perimeter 202 and at least one entry door 204. The building 200 includes an interior 220 with a former dry-cleaning machine area defined by the broken line 214 in FIG. 2. As will be described, a first part of the remediation process is detecting if there is any contaminants at a location below the slab of the building. In the embodiment of FIG. 2, a plurality of detection or sampling locations are illustrated. For instance, a first sampling location 206, a second sampling location 208, a third sampling location 210 and a fourth sampling location 212 are shown. These sampling locations are disposed within the dry-cleaning machine area 214. For purposes of this disclosure, the dry-cleaning machine area 214 may be referred to as the contaminated area.

Upon sampling the sub-slab area and determining the contaminated area requires vapor remediation, the embodiment of FIG. 2 further illustrates a plurality of injection points or locations 216 where ozone or a combination of ozone and UV light and/or OH radicals may be applied. Here, the ozone/UV light/OH points or locations 216 may be strategically spaced to allow the ozone, UV light, and/or OH to disperse at each location and substantially cover the contaminated area 214. In FIG. 2, the ozone, UV light, and/or OH radicals may cover a defined application zone or radius 218. Each injection location may be spaced closer to adjacent injection locations so that adjacent radii partially overlap with one another. In doing so, the remediation process may reduce or eliminate toxic vapors located below the slab of the building 200.

Figure 3:
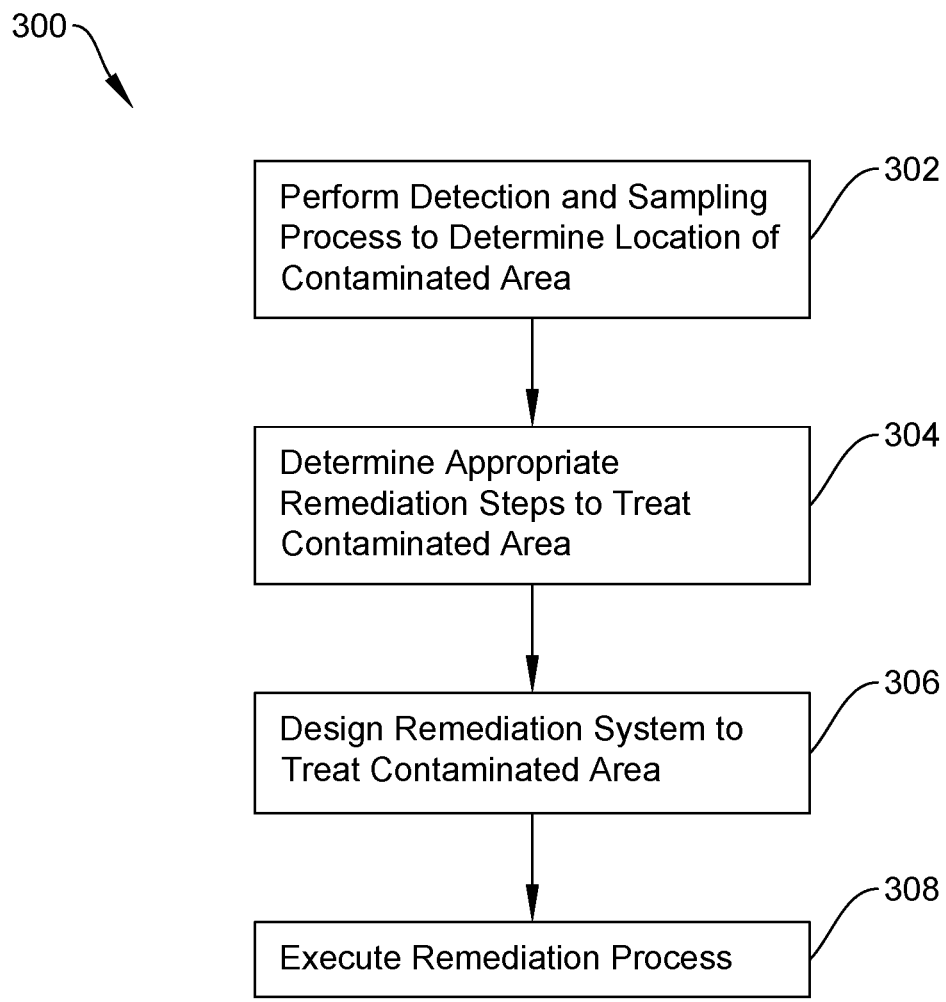
FIG. 3 is a flow diagram of one embodiment of a remediation process for treating contaminated vapors below the concrete slab of a building.

Referring to FIG. 3, one embodiment of a remediation process 300 is shown. In this process 300, a plurality of blocks or steps may be executed. For example, in a first block or step 302, a detection and sampling process may be performed to determine if there is contamination and, if so, the location of the contaminated area. In other words, it may be necessary to obtain and review past and current operating records of the business/manufacturing entity housed currently or in the past at the building. This may include, for example, present and past chemicals used, material safety data sheets, equipment used and locations, materials and wastes generated, waste management and disposal practices and records, environmental permits, as-built building diagrams showing piping lines for raw materials, intermediates, products and wastes, as well as utilities, underground and above ground storage tanks, degreasing equipment and operations, dry cleaning machines, raw chemical and waste storage areas, and any other information that would indicate locations of potential releases of contaminants to the building's sub-slab.

In addition to obtaining the aforementioned information, designated personnel may conduct a site visit to assess the presence of actual and potential locations of releases of organic contaminants to the sub-slab. In doing so, a public and private utility location assessment may be performed in the building and its immediate adjoining area. It may further be necessary to understand the remedial needs of the property owner, including present and future use of the building, which will determine the clean-up goals required to be achieved for the sub-slab vapors and the indoor air. The assessment may also include collecting paired sub-slab vapor and indoor air samples at multiple locations and at different times in the vicinity of known or suspected releases to the sub-slab, taking into consideration the spatial and temporal variability inherent with sub-slab vapor and indoor air sampling. An example of this step is shown in FIG. 2 with the different sample locations within a defined area.

In a second or subsequent block 304, a pilot test may be performed at the building to evaluate the presence of sub-slab obstructions that could impede the success of the ozone, UV light, and/or OH injections. Here, the appropriate remediation steps to treat a contaminated area may be determined. Obstacles and the like may be important to understand as an appropriate remediation strategy is developed.

In a third block 306, a remediation system may be designed to treat the area of contaminated vapors. In order to configure the appropriate design of the overall system, many factors may be evaluated. For example, and not to be limiting, the following factors may be considered when designing the appropriate remediation system to treat the area of contaminated vapors:

the areas where remediation of the sub-slab is required;
the radius of influence 218 of the ozone, UV light, and/or OH injection points 216;
the depth of the injection points;
the ozone and/or OH mass required;
the ozone, UV light, and/or OH application rate;
the mode of ozone, UV light, and/or OH injections (continuous or pulsar and at what intervals);
the type of ozone, UV light, and/or OH generation equipment required;
the type of drilling equipment required;
the type of tubing required and size of the tubing and associated screen for the injection points;

the piping, manifolds, electrical wiring and power required;

whether the synergistic effect of UV light and/or OH to the ozone injections is desirable, and the required wave length of the UV light and its application areas, if a UV light were desirable, and the required OH application rate, if OH injections were desirable;

the ozone monitoring required in the sub-slab and indoor air;

the time required to complete the remediation; and the appropriate confirmation sampling.

On the vapor remediation system designed in block 306, the remediation system may be implemented and the remediation process may be executed. Here, the injection points 216 may be drilled in the desired locations and to the desired depths. The ozone unit 114 and tubing 128 may be installed and riser pipes 130 and screens 132 may be disposed at each injection point. Once the equipment is installed, ozone may be applied at each injection location corresponding to the previously determined ozone mass required, application rate, and time required to complete the ozone remediation, as well as UV light and OH, if desirable.

The vapor remediation process can be dependent upon the building type or size. Moreover, the contaminant type may factor into the overall process. An example of a vapor remediation system and process implemented on a dry-cleaning building will now be described to further illustrate how a system and process may be executed for a given area of vapor contamination.

EXAMPLE

In one example, a Sub-Slab Site Investigation (SSI) identified vapors under a building previously used for dry-cleaning with elevated concentrations of chlorinated volatile organic compounds (cVOCs), especially in the area of the former dry-cleaning machines. The cVOCs in the sub-slab under the building may be a primary source of elevated concentrations as reported in sub-slab vapor intrusion sampling (i.e., soil gas). Given the difficulty in treating cVOCs vapors under a building combined with the building occupancy, remediation personnel evaluated multiple remedial alternatives to treat the cVOCs vapor contamination under the building. As part of the assessment of the building, the personnel recommended installation of an ozone injection system to aggressively attack cVOCs vapors below the former source area. The ozone injection system would target sub-slab vapors where the former dry-cleaning machines were located. The objective of the ozone injection system will be cVOCs reduction in soil gas to levels such that a vapor mitigation system for the building or continuous monitoring are not required for Site closure.

As for the scope of the project, past sampling of sub-slab vapor under the building reported elevated concentrations of tetrachloroethene (PCE) well above the regulatory Vapor Exposure Indoor Air (IA) Screening Levels (SLs), as adjusted for attenuation through the sub-slab, for the commercial/industrial use scenario applicable to the Site. Based on this data assessment and regulatory guidance, remediation of the sub-slab vapors and shallow vadose soil below the building was determined to be necessary.

The ozone injection system was next contemplated for performing the remediation of the contaminated vapors in the area. To do so, 'hot-spot' treatment was recommended of the sub-slab vapors under the building where the dry-cleaning machines were located. The proposed remediation method of treatment for the sub-slab vapors included injection of ozone gas into the cVOC impacted vadose zone below the building slab. By this process, ozone would directly oxidize gaseous, free, sorbed and dissolved cVOCs and convert them to carbon dioxide and water. Ozone would be able to react with cVOCs in soil gas, and offer rapid treatment time and the ability to treat high concentrations of contaminants.

For treatment below the building, a cabinet-style ozone generation unit was located within the building. While larger units may be commercially available, the ozone unit for the planned treatment footprint has the capacity to generate 53 grams/hour (or 2.75 pounds/day) of ozone. The unit has a maximum pressure of 50 pounds per square inch (psi) and capable of flows up to 4 cubic feet per minute (CFM). Injected gas is ozone and oxygen or a mixture of ozone, oxygen and ambient air. Using in-situ ozone injection points (OIPs), the unit releases ozone gas in a controlled duration and sequence into up to 20 OIPs (e.g., 30-minute injection per OIP), via a computer controlled valve manifold. After injection at each of the OIPs (one cycle), operation pauses and then repeats the OIP injection cycle. The cycle specifics were field determined. The cabinet-style ozone unit included a footprint of approximately 2×4 feet (ft.) and 5 ft. height. The only utility connection required for operation is electric (i.e., 230 VAC, 30 amp).

Under the remediation process, a total of 20 OIPs were installed within the building and completed as vadose zone points installed to a depth up to three feet below the slab surface. The design and number of OIPs was based on the site-specific characteristics of the sub-slab fill materials, capacity of the ozone unit, and usage of the building. The OIPs (spaced 5 to 6 feet on-center and depths of 1 to 3 feet) target sub-slab cVOCs vapors where the former machines were located. OIP locations and screen depths required adjustment based on encountered field conditions.

Each OIP was constructed using a 6-inch stainless steel screen, ¼-inch diameter rigid tubing, and compression fittings connected to above grade flexible tubing. A pack of glass beads was placed around and slightly above the screen, followed by a bentonite-cement grout seal, then concrete to seal the OIPs at the floor slab surface. The OW stainless steel riser and fitting connected to ½-inch ozone compatible flexible tubing, and the tubing to the manifold on the ozone unit. The flexible tubing was bundled and run along the base of the wall to the ozone unit located in the east/northeast portion of the building which was used for storage.

For ozone treatment, a total of 20 OIPs were connected to the ozone unit manifold and configured for ozone injection. Operation of the ozone unit was 24-hours/day, 7-days/week, for a period of one month. This operating scenario resulted in approximately 36 total hours of intermittent ozone injection in each of the OIPs over the one-month treatment period. An example of the OIP layout is illustrated in FIG. 2, as described above.

Prior to initiating the ozone system installation, a geophysical survey was conducted using electro-magnetic (EM) and ground-penetrating radar (GPR) equipment to attempt to verify a presence of utilities in the proposed injection point locations.

Following startup, the operation, maintenance and monitoring (OM&M) phase was initiated. An OM&M manual supplement was prepared to the vendor provided manual which described the site-specific settings and operations. The ozone system operation was inspected daily by an appropriate field engineer during the first week of operation to assure it operates according to specifications. The inspections continued every five to seven days for the period of operation. Maintenance of the ozone unit was performed as required, and included replacement of filters and other vendor provided consumables.

During each inspection, the system was monitored for leaks, ozone concentrations within the building interior, operation flows and pressures, and overall functioning of the system. The system design included a programmable logic controller (PLC) which monitored and controlled system operations including the detection of ozone leaks within the building and automated system shut-down in the event of elevated indoor air levels (ozone level >0.01 ppm). The detection of elevated ozone levels additionally included a strobe lamp, audible horn, and cellular telemetry system notification. Inspection of the system for ozone leaks occurred daily during the first week of operation and then at least weekly throughout the operation period. The ozone leak inspection was completed using a hand-held ozone monitoring device capable of detections to (0.001 ppm). The OSHA PEL and NIOSH REL for ozone is 0.1 ppm.

The treatment effectiveness of the sub-surface ozone injection was determined by paired vapor intrusion sampling of sub-slab and indoor air samples. Sampling was performed prior to system start-up (baseline conditions), then after two weeks of operation and finally following shut-down of treatment operation. The two-week and final sampling events were performed after the ozone system had been shut down for two days and the samples were collected from four sub-slab vapor points, plus one indoor sample and one exterior sample (six samples). Samples were collected using Method TO-15 and analyzed for cVOCs.

Following the period of treatment operation, and the post-operation sub-slab vapor sampling evaluation, an Interim Remediation Summary Report was prepared. The report summarized the sub-slab treatment system equipment, installation, operations, and the results of sampling. The summary report included figures indicating the locations of equipment and monitoring points, and tables summarizing the operations and treatment results. The summary report was prepared as a stand-alone report for regulatory submittal and closure of the ozone treatment system.

The sub-slab vapor treatment system was planned for one-month of operation. Upon reaching the one-month period, all equipment usage was discontinued. The balance of the vapor treatment system was shut-down, disconnected/capped, and stored pending post-treatment sampling and assessment. The OIPs were closed but not abandoned, in case additional ozone injections are desirable. At the end of all injections, the OIPs would be abandoned and the concrete floor and other disturbed areas restored to pre-install conditions.

Design completion and installation of the vapor treatment system (i.e., ozone system and associated equipment) required approximately four weeks. System startup was performed at one day conducting periodic monitoring, troubleshooting and operations adjustments. Ozone injection occurred for one month, with one inspection per week. Decommissioning of the ozone system was performed in one day. The sub-slab and vapor intrusion sampling events (pre-, mid-, and post-treatment) were performed at one day each (8-hrs per event). Significant degradation of cVOCs vapor in the sub-slab sampling locations have been observed by comparing analytical results of the pre-, mid-, and post-remediation sampling events. Sub-slab PCE concentrations above the Commercial/Industrial Screening Level were reported in the four sub-slab sampling locations during the pre-remediation sampling event. PCE vapor concentrations in two of the sampling locations have been successfully reduced below the Commercial/Industrial Screening Level after the one-month ozone treatment. The one-month ozone treatment has achieved the vapor remediation goal in these areas. The reported post-remediation PCE concentrations in the other two sub-slab vapor sampling locations showed approximately a fifty percent reduction of the pre-treatment values.

The previous example is provided only for purpose of demonstrating how a vapor remediation process and system may be implemented to treat sub-slab vapor contaminants. Additional factors or steps may be executed as part of the overall process. For example, it may be necessary to repeat ozone application at one or more locations. Moreover, it may be determined that an additional injection location is needed to adequately treat the entire area of vapor contamination. Further sampling and detecting of vapor contamination post-treatment may be necessary to determine the effectiveness of the previous treatment. Subsequent vapor remediation processes may be executed until the contamination area is completely treated, or at least treated to an extent determined to be satisfactory to meet government guidelines. In any event, it has been found that ozone remediation is an effective tool for treating sub-slab toxic vapors and other contaminants. Likewise, ozone remediation may be used in other areas such as an interior of a building space above the slab. In some instances, it may be used to treat a crawl space, basement or other area located below a main living or occupant space.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A vapor remediation system for performing a remediation process for treating contaminated vapors located in an area below a slab of a building, comprising:
  an ozone unit for generating a supply of ozone;
  a plurality of injection locations defined in the sub-slab area, where each of the plurality of injection locations is spaced from another of the plurality of injection locations by a predefined distance;
  a riser pipe positioned at each of the plurality of injections locations, the riser pipe having a defined length configured to extend from a top surface of the slab to a location below the slab, where the riser pipe comprises an outlet at the location below the slab;
  tubing coupled between the ozone unit and the riser pipe; and
  a UV light unit for emitting UV light;
  wherein, during the vapor remediation process, the ozone unit is disposed in an enabled position to dispense ozone through the tubing and the riser pipe;
  wherein, the ozone exits the outlet of the riser pipe at each of the plurality of injection zones and disperses in the area below the slab to treat contaminated vapors located thereabout; and
  wherein, the UV light unit is coupled to each of the plurality of injection zones and the riser pipe to emit UV light at each of the plurality of injection zones simultaneously as the ozone unit dispenses ozone in the area below the slab.

2. The vapor remediation system of claim 1, further comprising a plurality of application zones defined at each of the injection zones by an area of dispersion of the ozone, wherein each of the plurality of application zones at least partially overlaps with another of the plurality of application zones.

3. The vapor remediation system of claim 1, further comprising a screen coupled near the outlet of the riser pipe.

4. The vapor remediation system of claim 1, further comprising a hydroxyl radical (OH) unit for generating hydroxyl radicals, the hydroxyl unit coupled to each of the plurality of injection zones for supplying hydroxyl radicals with the ozone at each of the plurality of injection zones.

5. The vapor remediation system of claim 1, further comprising:
a hydroxyl (OH) unit for generating hydroxyl radicals, the hydroxyl unit coupled to each of the plurality of injection zones for supplying hydroxyl radicals with the ozone at each of the plurality of injection zones;
wherein, the hydroxyl unit is operably coupled to the riser pipe to supply hydroxyl radicals simultaneously as the ozone unit dispenses ozone to each of the plurality of injection locations.

6. The remediation system of claim 1, wherein one end of a first riser pipe is arranged in a first layer of gravel that adjoins, and is located below, the slab, and wherein one end of a second riser pipe is arranged in a second layer of soil located below the first layer of gravel such that the one end of the second riser pipe is located beneath the one end of the first riser pipe relative to the slab.

7. A method for treating contaminated vapors in an area below a slab of a building, where the slab is located above a first layer of gravel and a second layer of soil, the method comprising:
providing an ozone unit, at least one riser pipe, and tubing;
detecting an area below the slab where contaminated vapors need treated;
forming at least one hole in the slab to define at least one injection location;
positioning the at least one riser pipe in the at least one hole at the at least one injection location, wherein positioning the at least one riser pipe includes positioning one end of a first riser pipe in the first layer of gravel and positioning one end of a second riser pipe in the second layer of soil such that the one end of the second riser pipe is located beneath the one end of the first riser pipe relative to the slab;
coupling the tubing between the ozone unit and the at least one riser pipe; and
dispensing ozone from the ozone unit to flow through the tubing and the at least one riser pipe to treat contaminated vapors in the area below the slab.

8. The method of claim 7, wherein the positioning step comprises positioning another end of the first or the second riser pipe at or above a top surface of the slab.

9. The method of claim 7, wherein the forming step comprises defining a plurality of injection locations in the area below the slab.

10. The method of claim 9, further comprising spacing each of the plurality of injection locations from one another by a predefined distance.

11. The method of claim 10, wherein the dispensing step comprises forming an ozone application zone at each of the plurality of injection locations, where the application zone formed at each of the plurality of injection locations at least partially overlaps another application zone at another of the plurality of injection locations.

12. The method of claim 7, further comprising dispersing ozone through a screen coupled at an outlet of the at least one riser pipe in the area below the slab.

13. The method of claim 7, further comprising:
providing a UV light unit;
coupling the UV light unit to the at least one injection location; and
emitting UV light from the UV light unit into the area below the slab.

14. The method of claim 13, wherein emitting UV light from the UV light unit includes emitting UV light from the UV light unit simultaneously with dispensing ozone from the ozone unit.

15. The method of claim 7, further comprising:
providing a hydroxyl unit;
coupling the hydroxyl unit to the at least one injection location;
supplying hydroxyl radicals from the hydroxyl unit into the area below the slab.

16. The method of claim 15, wherein supplying hydroxyl radicals from the hydroxyl unit includes supplying hydroxyl radicals from the hydroxyl unit simultaneously with dispensing ozone from the ozone unit.

17. A method for treating contaminated vapors in an area below a slab of a building, where the slab is located above a first layer of gravel and a second layer of soil, the method comprising:
providing an ozone unit, a UV light unit, a hydroxyl unit, and a plurality of riser pipes;
detecting if an area below the slab requires remediation of any contaminated vapors located thereabout;
determining how many and where an injection location is required to treat the area below the slab if contaminated vapors are detected;
forming a hole in the slab to define each injection location;
positioning one of the riser pipes in the hole at each injection location;
coupling the ozone unit, the UV light unit, and the hydroxyl unit to each injection location; and
treating contaminated vapors by dispensing ozone from the ozone unit, emitting UV light from the UV light unit, and supplying hydroxyl radicals from the hydroxyl unit in the area below the slab, wherein treating the contaminated vapors includes simultaneously dispensing ozone from the ozone unit, emitting UV light from the UV light unit, and supplying hydroxyl radicals from the hydroxyl unit in the area below the slab.

18. The method of claim 17, further comprising spacing each injection location apart from one another by a defined distance such that the ozone dispensed, the UV light emitted, and the hydroxyl radicals supplied at one injection location overlap with the ozone dispensed, the UV light emitted, and the hydroxyl radicals supplied at an adjacent injection location.

19. The method of claim 17, further comprising coupling tubing from the ozone unit, the UV light unit, and the hydroxyl unit to the riser pipe at each injection location.

20. The method of claim 17, wherein positioning one of the riser pipes in the hole at each injection location includes positioning one end of a first riser pipe in the first layer of gravel that adjoins, and is located below, the slab and positioning one end of a second riser pipe in the second layer of soil located below the first layer of gravel such that the one end of the second riser pipe is located beneath the one end of the first riser pipe relative to the slab.

\* \* \* \* \*